United States Patent [19]

Steele

[11] Patent Number: 5,393,035

[45] Date of Patent: Feb. 28, 1995

[54] FLOW CONTROL VALVE

[75] Inventor: James R. Steele, Stillwater, Minn.

[73] Assignee: Dynamic Air, Inc., St. Paul, Minn.

[21] Appl. No.: 200,142

[22] Filed: Feb. 23, 1994

[51] Int. Cl.⁶ ............................................. F16K 3/32
[52] U.S. Cl. ................................. 251/205; 137/556.6
[58] Field of Search ....................... 251/205; 137/556.6

[56] References Cited

U.S. PATENT DOCUMENTS

| | | | |
|---|---|---|---|
| 1,283,752 | 11/1918 | Haynes | 137/556.6 |
| 1,747,598 | 2/1930 | Popp | 137/556.6 X |
| 2,764,995 | 10/1956 | Krupp et al. | 251/205 X |
| 3,010,695 | 11/1961 | Banks | 251/205 |
| 3,575,207 | 4/1971 | Denner et al. | 251/205 X |

*Primary Examiner*—Arnold Rosenthal
*Attorney, Agent, or Firm*—Jacobson & Johnson

[57] ABSTRACT

A fluid control valve for an inline fluid control system comprising a housing having a fluid inlet and a fluid outlet, the housing having a rectangular shaped fluid passage for fluid to flow therethrough, the housing having a first cylindrical passage located therein and a second cylindrical passage located therein with the first cylindrical passage and the second cylindrical passage located in coaxial alignment with each other, the first cylindrical passage having a first diameter and second cylindrical passage having a second diameter with the first diameter larger than the second diameter and a stepped plunger slidably located in the first cylindrical passage and the second cylindrical passage, the plunger slidable with respect to the rectangular shaped fluid passage to permit one to increase or decrease the area for fluid to flow through the fluid passage, the stepped plunger having an enlarged portion to prevent the stepped plunger from being accidentally withdrawn from the housing and a flow control knob having threads for rotationally engaging the housing and a shoulder for engaging the stepped plunger so that rotation of the flow control knob on the housing axially displaces the plunger to increase or decrease the area for fluid to flow through the housing to thereby control the flow rate of fluid through the fluid valve in accordance with the rotation of the flow control knob. The flow control valve disassemble for cleaning and having vent passage to prevent accidental injury to a person as the valve is disassembled for cleaning.

10 Claims, 6 Drawing Sheets

FLOW CONTROL VALVE

FIELD OF THE INVENTION

This invention relates generally to flow control valves and, more specifically, to flow control valves for pneumatic conveying system in which the flow rate through the valve can be increased in direct proportion to rotation of the flow control knob.

BACKGROUND OF THE INVENTION

To accurately control the flow of fluids such as fluid control valves in pneumatic conveying system, it is usually necessary to have a fluid metering valve that can be adjusted to precisely meter the correct amount of fluid flowing into the system. One of the difficulties with prior art control valves is that the flow rate through the valve is generally not proportional to amount of rotation on the flow control knob. That is, if the valve is nearly closed, one revolution of the flow control knob may increase the flow rate by one unit, but if the valve is nearly half open one revolution of the control knob may increase the flow rate through the valve by two units. Thus the change in flow rate through the valve is dependent on the flow condition of the valve; namely, whether the valve is in a nearly closed condition or a fully open condition. The present invention provides a fluid-control valve which provides a linear relationship between the fluid flow rate and the rotation of the flow-control knob. Consequently, regardless of the flow condition of the valve, one rotation of the flow control knob on the valve provides a corresponding one unit increase or decrease in the flow rate through the valve. In addition, the unit is readily disassembled for cleaning, can be made from polymer plastics and includes safety features that prevent the valve from injuring a party if the valve is accidentally disassembled while under pressure.

SUMMARY OF THE INVENTION

Briefly, my flow-control valve includes a housing, a flow control knob, a plunger, an end cap, a fluid inlet and a fluid outlet with the flow control knob rotatable to open and close a fluid outlet port with an axially slidable plunger. The plunger includes a lip to prevent accidental blowout of the plunger and a vent passage extending through the housing threads for the end cap to permit pressurized fluid to escape from the flow control valve as the end cap is loosened. To increase or decrease the flow rate through the valve one rotates flow control knob 11 which axially displaces the plunger to thereby increase or decrease the area of the fluid outlet passage in the flow control valve in direct proportion to the number of rotations of the flow control valve.

DESCRIPTION OF THE PREFERRED EMBODIMENT

Figure 1:
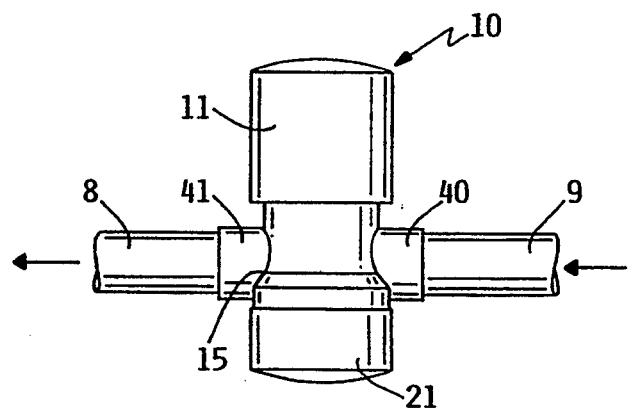
FIG. 1 shows a fluid-control valve located in a pneumatic air conveying system.

FIG. 1 reference numeral 10 generally identifies my readily disassembleable flow-control valve having a housing 15 a cylindrical flow control knob 11, an end cap 21, a fluid inlet 40 connected to an inlet pipe 9 and a fluid outlet 41 connected to an outlet pipe 8. To operate valve 10 to increase or decrease the flow through the valve one rotates flow control knob 11 with respect to housing 15.

Figure 2:
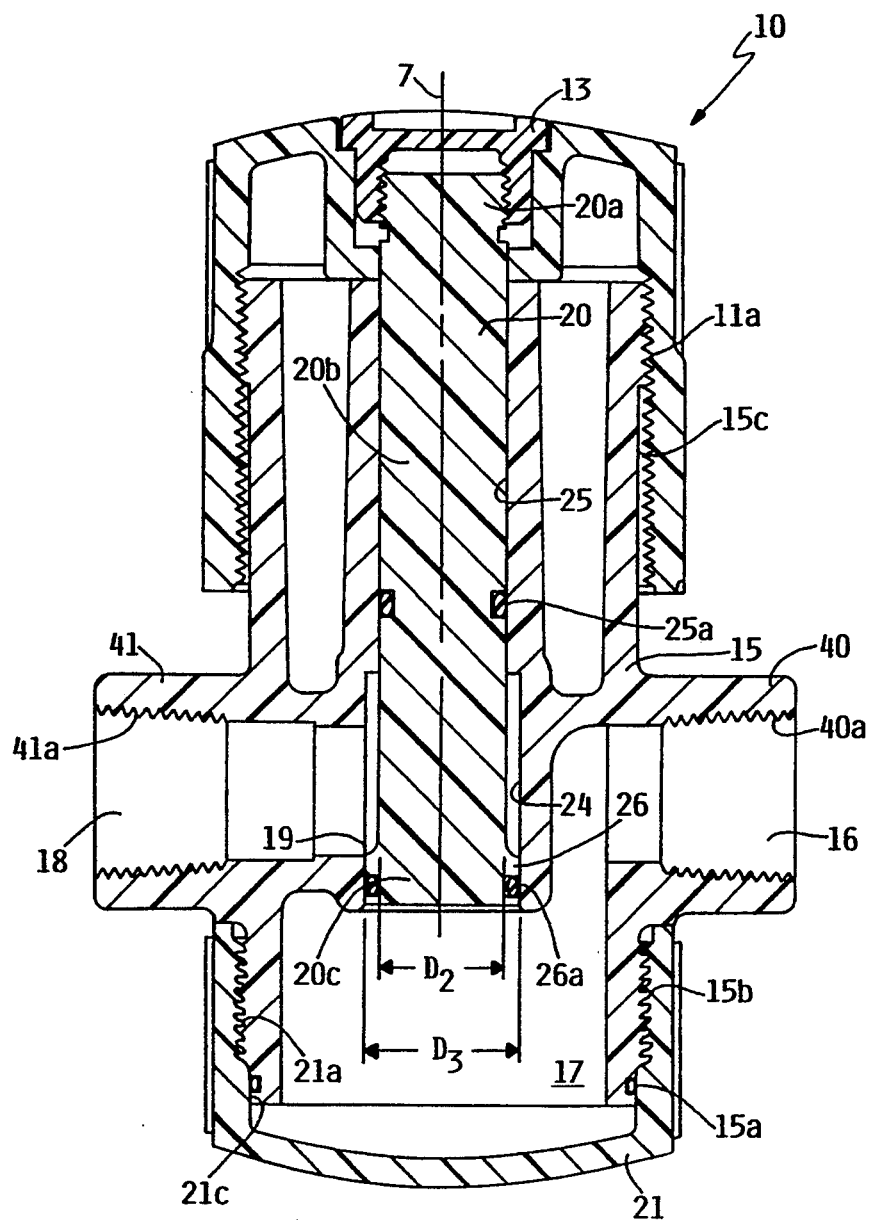
FIG. 2 is a cross-sectional view of the flow control valve of my invention in the closed condition.

FIG. 2 shows a cross-sectional view of valve 10 of FIG. 1 with the valve comprising an open ended housing or body 15 having a first cylindrical passage 25 and a second cylindrical passage 24 located in the center of housing 15. Located in a slidable relationship in passages 25 and 24 is a rotatable and axially displaceable stepped plunger 20 having a first partially threaded end 20a, an intermediate barrel portion 20b with a diameter $D_2$ and a second piston like end 20c with an annular lip 26 having a diameter $D_3$. Lip 26 has a diameter $D_3$ which is larger than the diameter of passage 25 to prevent plunger 20 from being blown out the top of housing 15 should the flow control knob be unscrewed from housing 15. The sealing ring 26a located on annular lip 26 forms a fluid tight seal between plunger annular lip 26 and cylindrical passage 24 when valve 10 is in the closed condition as shown in FIG. 2. Similarly, a sealing ring 25a located on plunger 20 forms a fluid tight seal between cylindrical passage 25 and plunger barrel 20b to prevent fluid from escaping along plunger 20.

Figure 8A:
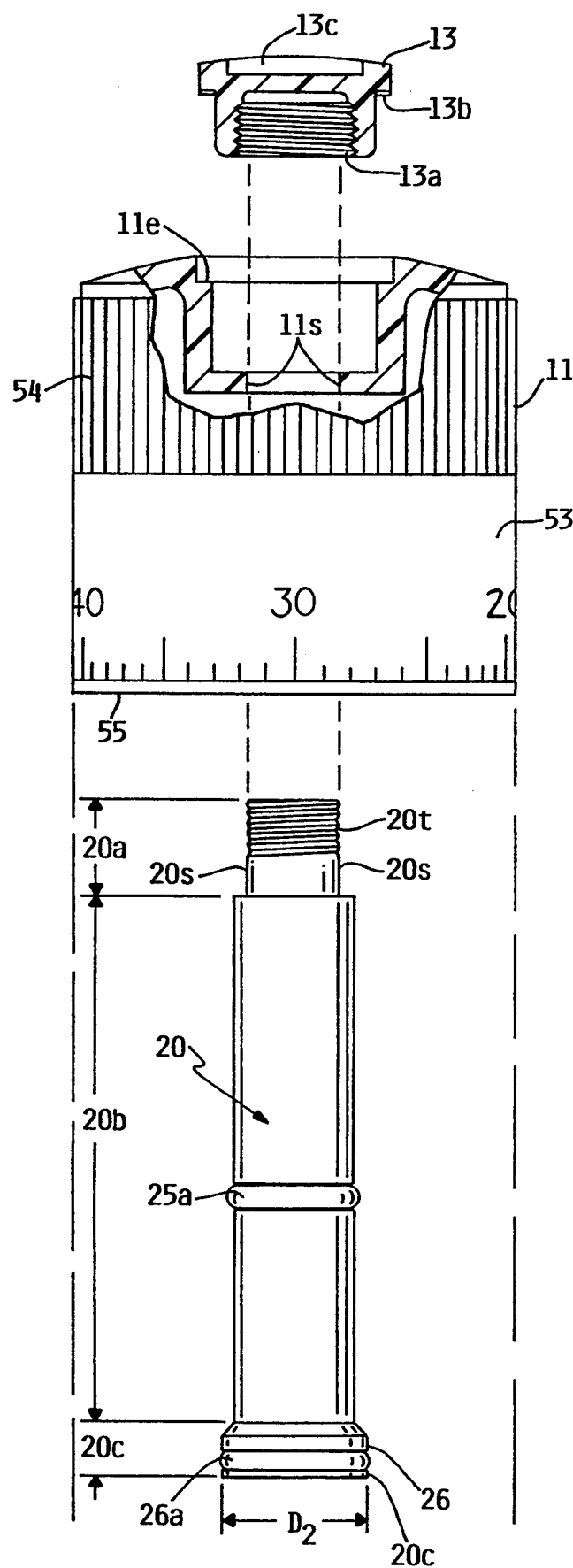
FIG. 8A is a partially exploded view showing the plunger, the flow control knob and plunger retaining cap of the present invention.
Figure 9:
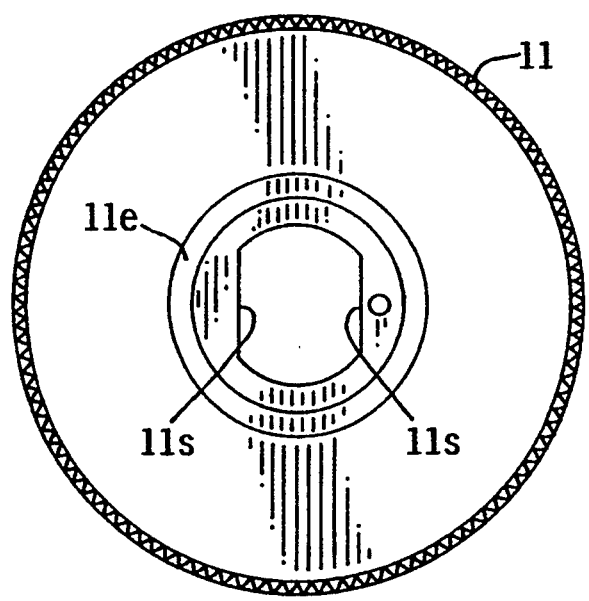
FIG. 9 is a top view of the flow control knob.

FIG. 2 and FIG. 8A show that first end 20a of plunger 20 connects to flow control knob 11 through flat shoulders 20s on plunger 20 and an oblong opening (FIG. 9) having mating shoulders 11s in flow control knob 11. A plunger retaining cap 13 is secured to the threaded end 20a of plunger 20 to hold the shoulders 20s of plunger 20 in contact with shoulders 11s so that rotation of flow control knob 11 also rotates plunger 20.

The inside of flow control knob contains female threads 11a and housing 15 contains mating threads 15c. Consequently, the rotation of flow control knob 11 on threads 11a axially displaces both the flow control knob 11 and plunger 20 along a vertical axis 7.

Figure 4:
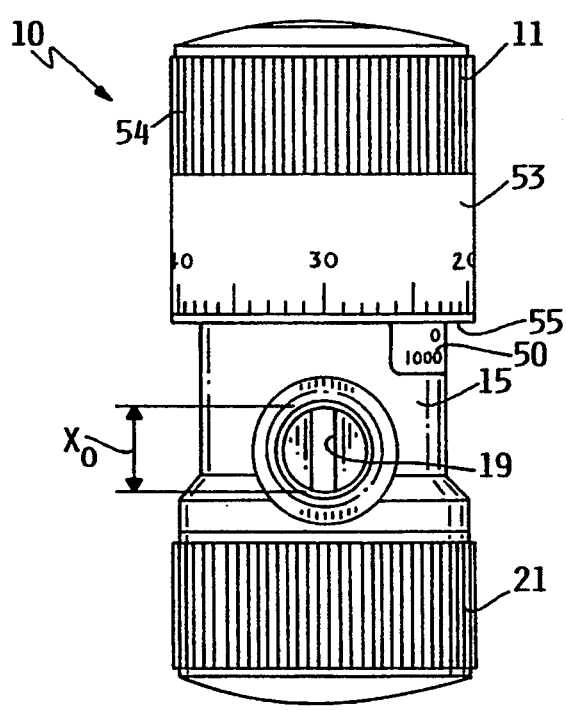
FIG. 4 shows a side view of my flow control valve showing the valve outlet port in a fully open condition.

Housing 15 includes an inlet 40 having a threaded section 40a for engaging with pipe threads on an inlet pipe. Housing 15 includes an inlet fluid passage 16 which connects to a plenum chamber 17 which is formed by the lower end of housing 15 and end cap 21. Fluid chamber 17 connects to outlet passage 18 through a variable opening formed between plunger 20 and an elongated rectangular shaped fluid passage 19 located in housing 15. FIG. 4 shows a frontal view of the elongated rectangular shaped fluid passage 19 which is located in housing 15.

End cap 21 has a threaded section 21a for engaging threads 15b on the lower end of housing 15. A sealing ring 15a extends around the end of housing 15 to seal an end cap annular sealing surface 21c thereto in a fluid-tight relationship to prevent fluid from escaping past end cap 21 and the end of the housing.

In the preferred embodiment my valve is made of polymer plastics. Plunger 20 may be made of acetal and housing 15 and end caps may be made of material such as Dupont Sytel nylon resin.

FIG. 2 shows flow control valve 10 in the closed condition. In the closed condition fluid can not flow through valve 10. FIG. 2 shows that in the closed condition annular lip 26 of plunger 20 extends into fluid sealing engagement with the lower portion of passage 24 to prevent fluid from flowing from plenum chamber 17 to outlet passage 18.

FIG. 2-6 illustrates various flow control positions of the axially displaceable plunger 20 and annular lip 26 in passage 24 of flow control valve 10.

As stated, FIG. 2 shows the fully closed condition (referred herein as position A) with annular lip 26 of plunger 20 located in a sealing relation with passage 24. In this condition fluid can not flow through valve 10 as the annular lip 26 seals off the fluid passage 19.

Figure 3:
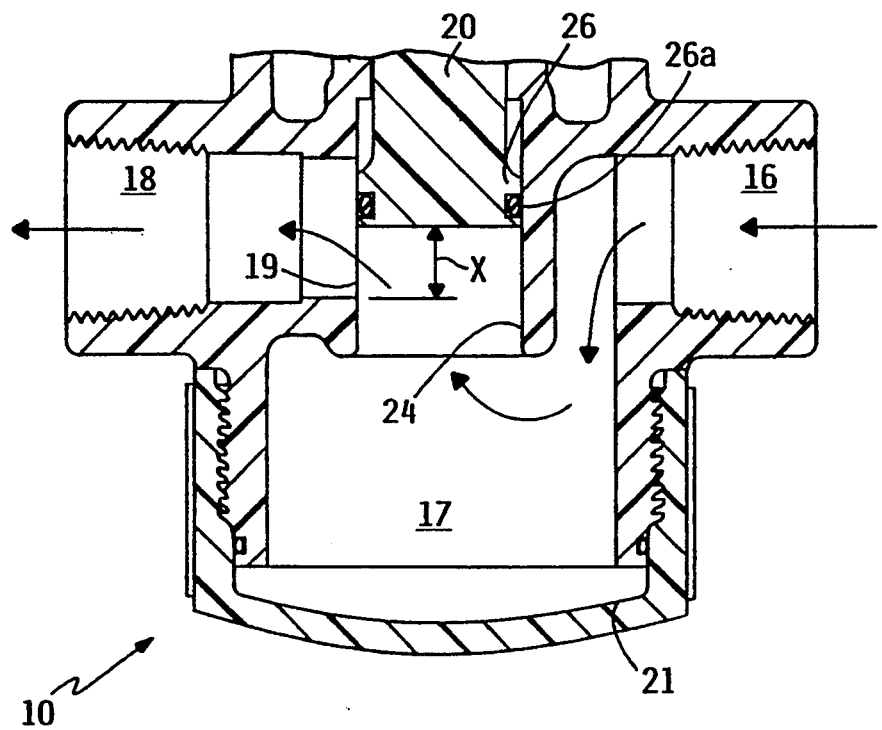
FIG. 3 is a partial cross-sectional view of the flow valve of FIG. 2 showing the valve outlet port in a partially open condition.

FIG. 3 shows the flow control valve 10 in the open condition with the length of the opening formed by the end of plunger 20 and the housing designated by "x". In this condition the fluid flows from passage 16 into plenum chamber 17 through passage 19 and out passage 18 as indicated by the arrows.

FIG. 4 shows the flow control valve 10 in the fully open condition with the length of the passage 19 designated by $x_0$. In this condition the fluid also flows through the valve 10 and out the fully open passage 19.

Figure 5:
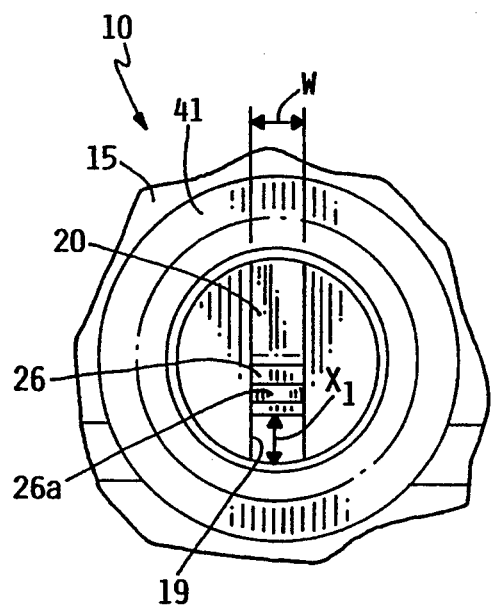
FIG. 5 is a partial view showing the fluid control valve of FIG. 2 showing the valve outlet port in a partially open condition.

FIG. 5 shows the flow control valve 10 in the partially open condition (referred herein as position B) with the length of the opening in the outlet port designated by $x_1$. Note the width of the opening of fluid passage 19 is designated by "w" and remains constant but the height of the opening of fluid passage (designated by x) varies with the position of plunger 20. Consequently, the flow area through the valve for any flow condition is "$x_1$" times "w".

Figure 6:
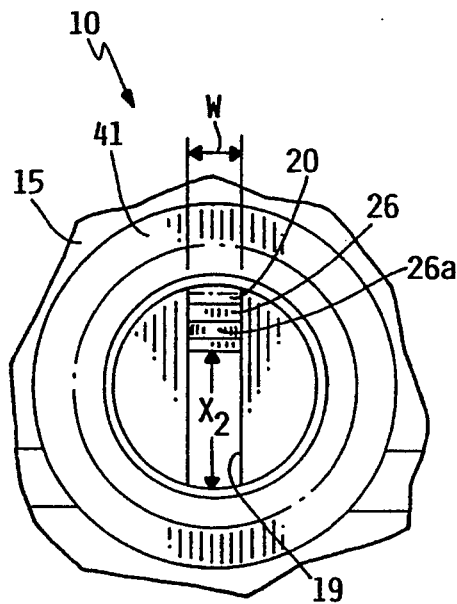
FIG. 6 is a partial view showing the fluid control valve of FIG. 2 showing the valve outlet port in a nearly fully open condition.

Similarly, FIG. 6 shows the flow control valve 10 in another partially open condition (referred herein as position C) with the length of the opening in the outlet port designated by $x_2$. Consequently, the flow area through the valve is "$x_2$" times "w".

For graphical illustration of the flow rate through my valve as a function of the plunger position, the position of plunger 20 in FIG. 2 was designated as position A, the position of plunger 20 in FIG. 5 designated as position B and the position of the plunger 20 in FIG. 6 was designated as position C.

Figure 7:
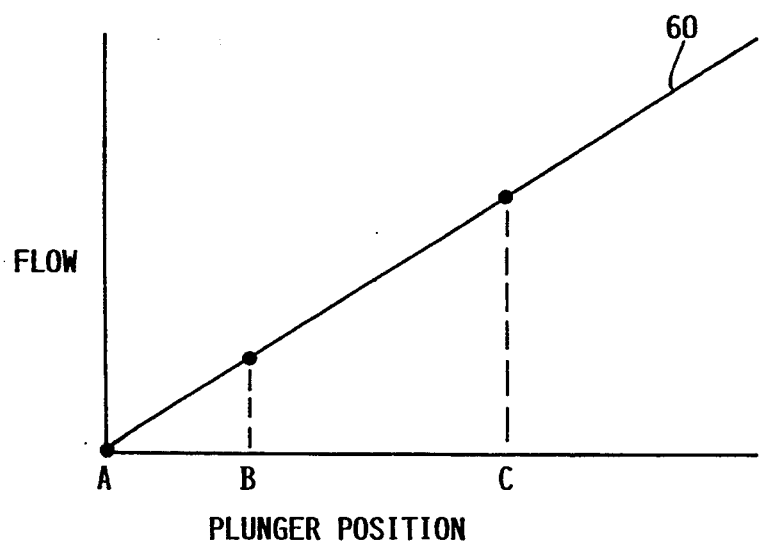
FIG. 7 is a graph of the flow through the valve of FIG. 2 as a function of the rotation of the control knob.

FIG. 7 graphical shows the flow rate through the flow control valve as a function of plunger position, which is a direct function of the rotation of flow control knob 11. Line 60 shows that the flow rate through valve 10 increases and decreases in a linear manner. That is, with the larger opening of fluid passage 19 (plunger position C in FIG. 6) more fluid flows through valve 10 than with the smaller opening of fluid passage 19 (plunger position B in FIG. 5).

FIG. 8A shows a partial exploded view of plunger 20, flow control knob 11 and retaining cap 13 of valve 10.

The first end 20a of stepped plunger 20 includes parallel shoulders or flats 20s with a partially threaded section 201 for engaging female threads 13a in retaining cap 13. In the assembled condition shoulders 20s are abutted against plunger shoulders 11s to form locking engagement with flow control knob 11. To secure plunger 20 to flow control valve knob 11 in a non rotating relationship, retaining cap threads 13a engage threads 201 of plunger 20 to hold plunger 20 retaining cap 13 and flow control knob 11 as a single unit.(see FIG. 2)

Figure 10:
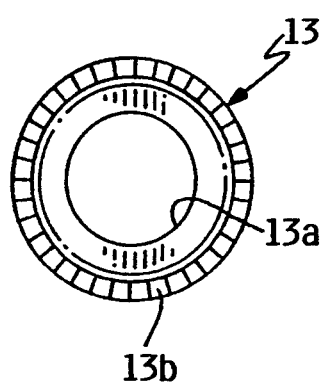
FIG. 10 is a bottom view of the plunger retaining cap.

Retaining cap 13 has a top slot 13c for engagement by a screwdriver or the like. Cap 13 includes a lower shoulder 13b which is shown in FIG. 10 to have a series of ratchet like teeth 13a thereon to frictionally engage flow control knob 11 to prevent retaining cap 13 from working loose during use of valve 10.

To fasten plunger retaining cap 13 to plunger 20, one places the blade of a screwdriver or the like in slot 13c and plunger retaining cap 13 on plunger 20. Next, one rotates the retaining cap 13 onto the top portion of control knob 11 to lock control knob 11, plunger 20, and plunger retaining cap 13 as a single unit.

Figure 8B:
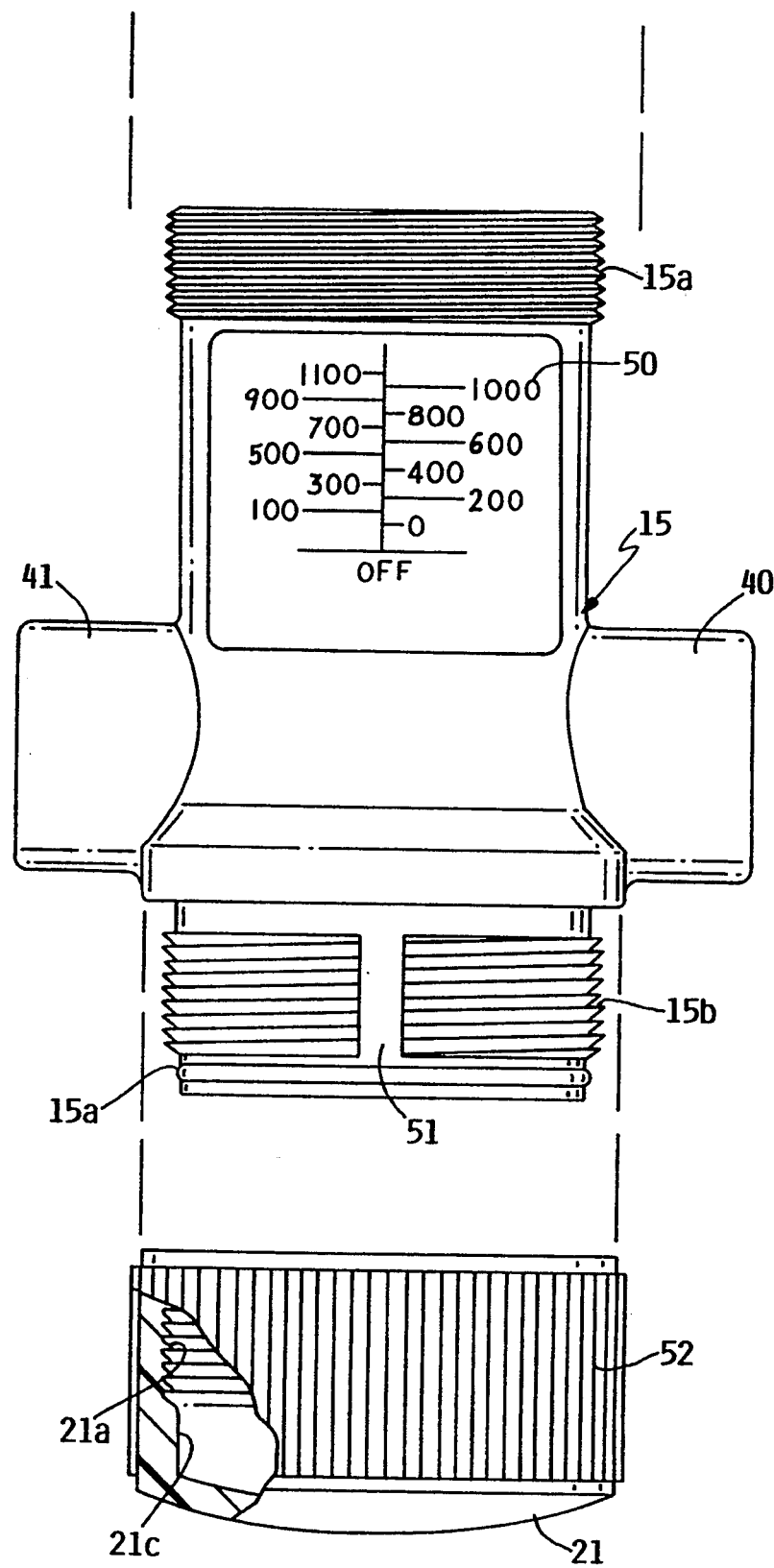
FIG. 8b is a partially exploded view showing the housing and retaining cap of the present invention.

FIG. 8B shows an exploded view of housing 15 and end cap 21. Housing 15 includes male threads 15b with an interrupted passage 51 extending transversely through threads 15b. A sealing ring 15a located on the lower end of housing 15 normally forms fluid sealing engagement with a sealing surface 21c on the inside of end cap 21. End cap 21 has a ribbed surface 52 to permit a user to grasp and rotate end cap 21. The purpose of having end cap 52 removable is to allow insertion of plunger 20 upward into housing 15. That is, because plunger 20 has a stepped condition produced by annular lip 26 it can only be inserted into the stepped cylindrical passages 24 and 25 of housing 15 through the bottom of housing 15 (FIG. 2). The purpose of the passage 51 provides a safety feature during disassembly of valve 10. That is, passage 51 enables pressurized gasses in housing 15 to be slowly vented therethrough so that when cap 21 is removed, it will not be blown off by the pressurized gas in valve 10 and possibly injure the user or a person located proximate the valve.

FIG. 8A shows that flow control knob 11 has a circumferential scale 53 and a ribbed surface for an operator to grasp and rotate flow control knob 11. While FIG. 8B shows housing 15 has a scale 50 that extends axially along housing 15. Scale 50 provides an axial reference for the number of whole revolutions of flow knob 11 while scale 53 provides a circumferential reference for a partial revolution of flow knob 11.

For operation of the valve refer to FIG. 2 and FIG. 4. In operation of valve 10 the operator grasps the ribbed surface 54 on flow control knob and observes the markings on scale 53 on flow control knob 11. The lower edge 55 of flow control knob 11 is used as a reference for scale 50 (FIG. 8B) on housing 15. By rotating flow control knob 11 on threads 15a, one can axially displace flow control knob 11 along axis 7. As flow control knob 11 moves along axis 7 it correspondingly axially displaces piston 20 to change the size of opening of fluid passage 19. By having a scale 50 on housing 15 and a scale 53 (FIG. 8A) on flow control knob one can precisely determine the number of full and partial revolutions flow control knob 11 and consequently the flow rate through valve 10. For example, if scale 53 is graduated in percentage of a revolutions of flow control knob one can quite accurately turn knob 11 for any specified portion of a revolution of knob 11 and scale 50 can be referred to for determining the whole revolutions of flow knob 11. In the preferred mode the scale 50 can be calibrated with the flow rate through valve 10 for each whole revolution of knob 11. The operator can than precisely adjust the control by using reference scale 53 in conjunction with scale 50. The pitch of the threads 15c on the housing 15 and on the flow control knob 11 determine the relative axial displacement of plunger 20 for each revolution of flow control knob 11. Because the width of the opening "w" (FIG. 5) remains constant the total area of the fluid passage 19 ("x" times "w") will increase or decrease in accordance with the amount of rotation of control knob 11. Thus a linear relationship has been established between the flow rate through the valve and the number of rotations of the flow control knob 11.

I claim:

1. A readily disassembleable fluid control valve for an inline fluid control system comprising:

a housing having a first end and a second end, said housing having a fluid inlet and a fluid outlet, said fluid outlet having a rectangular shaped fluid passage having an area for fluid to flow therethrough, said housing having a first cylindrical passage located therein and a second cylindrical passage located therein with said first cylindrical passage and said second cylindrical passage located in coaxial alignment with each other, said first cylindrical passage having a first diameter and second cylindrical passage having a second diameter with said first diameter larger than said second diameter;

a stepped plunger, said stepped plunger having a first end and a second end, said stepped plunger slidably located in said first cylindrical and said second cylindrical passage, said plunger slidable with respect to said rectangular shaped fluid passage to increase or decrease the area for fluid to flow through said rectangular shaped fluid passage, said stepped plunger having an enlarged portion to prevent said stepped plunger from being accidentally withdrawn from said housing;

a flow control knob having threads for rotationally engaging said first end of said housing and a shoulder for engaging said first end of said stepped plunger so that rotation of said flow control knob on said housing axially displaces said plunger to increase or decrease the area for fluid to flow through said housing to thereby control the flow rate of fluid through said fluid valve in accordance with the rotation of said flow control knob; and an end cap having threads for removably securing said end cap to said second end of said housing to permit disassembly of said fluid control valve.

2. A readily disassembleable fluid control valve for an inline fluid control system comprising:

a housing having a first end and a second end, said housing having a fluid inlet and a fluid outlet, said fluid outlet having a rectangular shaped fluid passage having an area for fluid to flow therethrough, said housing having a first cylindrical passage located therein and a second cylindrical passage located therein with said first cylindrical passage and said second cylindrical passage located in coaxial alignment with each other, said first cylindrical passage having a first diameter and second cylindrical passage having a second diameter with said first diameter larger than said Second diameter;

a stepped plunger, said stepped plunger having a first end and a second end, said stepped plunger slidably located in said first cylindrical and said second cylindrical passage, said plunger slidable with respect to said rectangular shaped fluid passage to increase or decrease the area for fluid to flow through said rectangular shaped fluid passage, said stepped plunger having an enlarged portion to prevent said stepped plunger from being accidentally withdrawn from said housing;

a flow control knob having threads for rotationally engaging said first end of said housing and a shoulder for engaging said first end of said stepped plunger so that rotation of said flow control knob on said housing axially displaces said plunger to increase or decrease the area for fluid to flow through said housing to thereby control the flow rate of fluid through said fluid valve in accordance with the rotation of said flow control knob; and a plunger retaining cap secured to said first end of said stepped plunger and to said flow control knob to permit rotation of said flow control knob, said plunger and said plunger retaining cap as a unit.

3. The fluid control valve of claim 1 wherein said end cap includes a sealing region for forming a fluid tight seal between said housing and said end cap.

4. The fluid control valve of claim 3 wherein said second end of said housing includes a threaded section for engaging the threads on said end cap with said threaded section on said second end including a fluid relief passage extending through said threads to permit fluid in said housing to escape before said end cap is completely removed from said housing.

5. The fluid control valve of claim 4 wherein said retaining cap includes a locking surface for locking engaging said flow control knob.

6. The fluid control valve of claim 1 including a sealing ring extending around said stepped plunger to slidable seal said stepped plunger in said first cylindrical passage to prevent escape of fluid between said stepped plunger and said first cylindrical passage.

7. The fluid control valve of claim 1 wherein said fluid control valve is made from a polymer plastic.

8. The fluid control valve of claim 2 wherein said plunger end cap includes teeth for forming locking engagement to the flow control knob to prevent the plunger end cap from accidentally loosening.

9. A readily disassembleable fluid control valve for an inline fluid control system comprising:

a housing having a first end and a second end, said housing having a fluid inlet and a fluid outlet, said fluid outlet having a rectangular shaped fluid passage having an area for fluid to flow therethrough, said housing having a first cylindrical passage located therein and a second cylindrical passage located therein with said first cylindrical passage and said second cylindrical passage located in coaxial alignment with each other, said first cylindrical passage having a first diameter and second cylindrical passage having a second diameter with said first diameter larger than said second diameter;

a stepped plunger, said stepped plunger having a first end and a second end, said stepped plunger slidably located in said first cylindrical and said second cylindrical passage, said plunger slidable with respect to said rectangular shaped fluid passage to increase or decrease the area for fluid to flow through said rectangular shaped fluid passage, said stepped plunger having an enlarged portion to prevent said stepped plunger from being accidentally withdrawn from said housing;

a flow control knob having threads for rotationally engaging said first end of said housing and a shoulder for engaging said first end of said stepped plunger so that rotation of said flow control knob on said housing axially displaces said plunger to increase or decrease the area for fluid to flow through said housing to thereby control the flow rate of fluid through said fluid valve in accordance with the rotation of said flow control knob; and a scale graduated in percentage of revolution of the flow control knob extending around the flow control knob and a reference scale on said housing reference to whole revolutions of the flow control knob to permit precise control of the amount of fluid flowing through said flow control valve.

10. A readily disassembleable fluid control valve for an inline fluid control system comprising:

a housing having an elongated fluid passage having an area for limiting fluid to flow therethrough;

a central axis extending through said housing and parallel to said elongated fluid passage;

a plunger, said plunger slidably located in said housing and slidable along said central axis and with respect to said elongated fluid passage to linearly increase or decrease the area for fluid to flow through said elongated fluid passage by axial displacement of said plunger, said elongated fluid passage and said plunger forming the sole means for varying the flow of fluid through said housing to thereby enable the flow through said housing to remain proportional to the position of the plunger with respect to said elongated fluid passage; and a flow control knob carded on said plunger with said flow control knob displaceable with respect to said housing to thereby displace both the flow control knob and the plunger to uniformly increase or decrease the area for fluid to flow through said fluid passage in accordance with a rotative position of the flow control knob.

* * * * *